United States Patent
Nos

(10) Patent No.: US 9,876,809 B2
(45) Date of Patent: Jan. 23, 2018

(54) STANDARD METADATA MODEL FOR ANALYZING EVENTS WITH FRAUD, ATTACK, OR ANY OTHER MALICIOUS BACKGROUND

(71) Applicant: SAP SE, Walldorf (DE)

(72) Inventor: Kathrin Nos, Nußloch (DE)

(73) Assignee: SAP SE, Walldorf (DE)

( * ) Notice: Subject to any disclaimer, the term of this patent is extended or adjusted under 35 U.S.C. 154(b) by 126 days.

(21) Appl. No.: 14/937,794

(22) Filed: Nov. 10, 2015

(65) Prior Publication Data
US 2017/0134408 A1    May 11, 2017

(51) Int. Cl.
*H04L 29/06* (2006.01)

(52) U.S. Cl.
CPC ...... *H04L 63/1416* (2013.01); *H04L 63/1425* (2013.01)

(58) Field of Classification Search
CPC . H04L 63/14; H04L 63/1408; H04L 63/1416; H04L 63/1425
See application file for complete search history.

(56) References Cited

U.S. PATENT DOCUMENTS

| | | | |
|---|---|---|---|
| 7,376,969 B1 * | 5/2008 | Njemanze | G06F 21/55 709/224 |
| 7,653,633 B2 * | 1/2010 | Villella | G06F 11/3476 370/386 |
| 7,676,760 B1 * | 3/2010 | Rosenquist | G06F 11/328 715/745 |
| 9,571,509 B1 * | 2/2017 | Satish | G06F 21/566 |
| 2003/0028620 A1 * | 2/2003 | Woelfel | G06F 17/30569 709/219 |
| 2005/0055372 A1 * | 3/2005 | Springer, Jr. | G06F 17/30997 |
| 2006/0047799 A1 * | 3/2006 | Bannach | H04L 41/00 709/223 |
| 2007/0283194 A1 * | 12/2007 | Villella | G06F 11/3476 714/57 |
| 2008/0162592 A1 * | 7/2008 | Huang | G06F 11/3476 |
| 2011/0271146 A1 * | 11/2011 | Mork | G06F 21/55 714/37 |
| 2012/0260306 A1 * | 10/2012 | Njemanze | G06Q 10/06 726/1 |

(Continued)

OTHER PUBLICATIONS

Lee et al. "CoMine: Efficient Mining of Correlated Patterns" [Online], 2003 [Retrieved on: Mat 5, 2017], University of Illinois at Urbana-Champaign, Retrieved from: < http://hanj.cs.illinois.edu/pdf/icdm03_comine.pdf >.*

*Primary Examiner* — Eric W Shepperd
(74) *Attorney, Agent, or Firm* — Mintz Levin Cohn Ferris Glovsky and Popeo, P.C.

(57) ABSTRACT

A standard metadata model for analyzing events with fraud, attack or other malicious background is disclosed. Log data for two or more computing systems is stored, and mapped to standardized attributes based on metadata entities defined for each computing system. A standard metadata model is defined for the computing systems, in which one or more standardized attributes of a first set of computing systems is associated with one or more standardized attributes of a second set of computing systems to define connected metadata that connects attributes of the associated metadata entities.

15 Claims, 4 Drawing Sheets

(56) References Cited

U.S. PATENT DOCUMENTS

| | | | |
|---|---|---|---|
| 2014/0040286 A1* | 2/2014 | Bane | G06F 17/30253 707/754 |
| 2014/0344622 A1* | 11/2014 | Huang | G06F 11/079 714/37 |
| 2016/0072741 A1* | 3/2016 | Hamilton | H04L 51/04 709/206 |
| 2017/0052766 A1* | 2/2017 | Garipov | G06F 8/34 |
| 2017/0063762 A1* | 3/2017 | Machol | H04L 51/36 |
| 2017/0063884 A1* | 3/2017 | Seigel | H04L 63/1416 |
| 2017/0063905 A1* | 3/2017 | Muddu | H04L 63/1425 |

\* cited by examiner

STANDARD METADATA MODEL FOR ANALYZING EVENTS WITH FRAUD, ATTACK, OR ANY OTHER MALICIOUS BACKGROUND

TECHNICAL FIELD

The subject matter described herein relates to security management of computer implemented events, and more particularly to a standard metadata model for analyzing events with fraud, attack or other malicious background.

BACKGROUND

Computer security and threat detection are hugely important in modern enterprise computing networks. There are various produces in use that are designed to detect malicious user activities. For instance, SAP SE of Walldorf, Germany provides at least two different products that are designed to detect malicious user activities. These are SAP Fraud Management (FM) for detecting malicious business events (e.g. money transfer for personal advantage) and SAP Enterprise Threat Detection (ETD) for detecting unauthorized access (e.g. attacking system by changing authorization data to get access to sensitive data), or performing other activities that endanger the system availability, data integrity, system integrity, or confidentiality.

Such products run analyses on large amounts of data, and are designed to generate alerts in case certain pre-requisites are met. These pre-requisites could be entries from certain logs (e.g. role assignment in the user audit log), or crossing certain thresholds (e.g. for money transfers in a financial transaction). The logs of each of these products have a different structures, as well as differences between which fields (IDs, attributes, . . . ) are part of the log.

Each of these products, as is consistent with many related products, feature what is known as a normalized log structure, i.e., a common log structure that allows a common search across a number of different logs within a product. However, even with a normalized log structure, a combined search among and across the two different products is still not possible, given the different attributes the products use for their log structures. A combined search would combine search results from one product and look for events correlated to this search in other products.

Most attacks on computer security entail multiple attacks on a "chain" of vulnerabilities: i.e., sophisticated hackers look to combine a number of "smaller" computer or network vulnerabilities in a concerted effort to obtain unauthorized access. Each of these vulnerabilities might look quite harmless, but their combination can open the door to a severe attack. What is needed is a way to correlate events among multiple systems to improve the chances of detecting such a combined attack.

SUMMARY

This document presents a computer-implemented approach for performing a combined search within a product and also across different products that govern access and use of related computing systems.

In one aspect, a standard metadata model for analyzing events with fraud, attack or other malicious background is described. A system, computer program product, and method includes storing log data for each of a plurality of computing systems, mapping the log data of each computing system to standardized attributes based on metadata entities defined for each of the plurality of computing systems, and defining a standard metadata model for the plurality of computing systems. The system, computer program product, and method further include associating one or more standardized attributes of a first of the plurality of computing systems with one or more standardized attributes of a second of the plurality of computing systems to define connected metadata that connects attributes of the associated metadata entities. The system, computer program product, and method further include storing the connected metadata in a central repository accessible by each of the plurality of computing systems, and for a selected access event to the first computing system, the selected access event generating the log data related to the first computing system, searching the standardized attributes associated with the log data of at least the second of the plurality of computing systems via the connected metadata stored in the central repository.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide a central metadata repository, which links different attributes to source log attributes for common users of disparate computer access systems.

Figure 1:
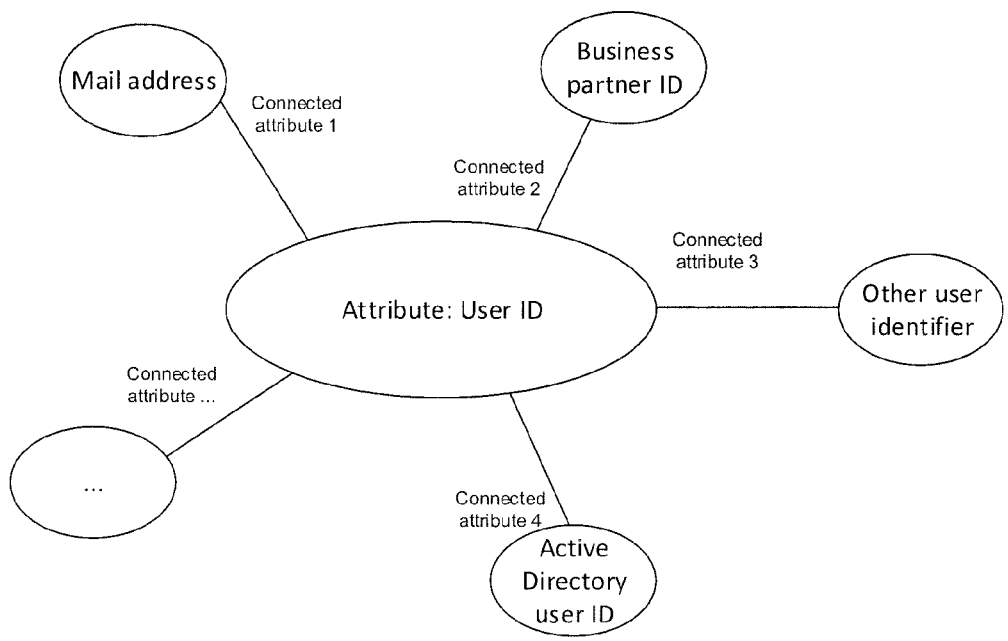
FIG. 1 illustrates one example of a metadata model, or "star model," built from connected or mapped attributes related to one of the computing systems.
Figure 1:
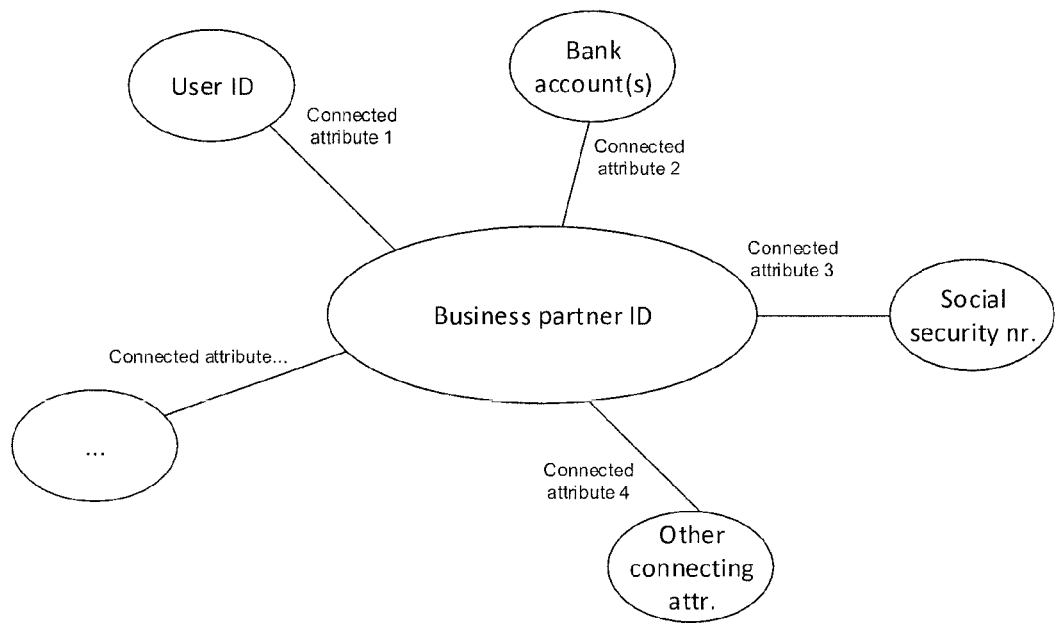

In some implementations, a system and method are presented in which log data for each of a number of different computing systems is gathered and stored. The log data of each computing system is mapped to standardized attributes based on metadata entities defined for each of the plurality of computing systems. FIG. 1 illustrates one example of a metadata model 100, or "star model," built from connected or mapped attributes related to one of the computing systems. As shown in FIG. 1, a user ID is connected to a business partner ID, and from there to a social security number associated with the user. From there, other metadata can be defined. Hence, a log event on the user might start with searching for further events for this user ID, then for this user's business partner ID, and so on.

Figure 2:
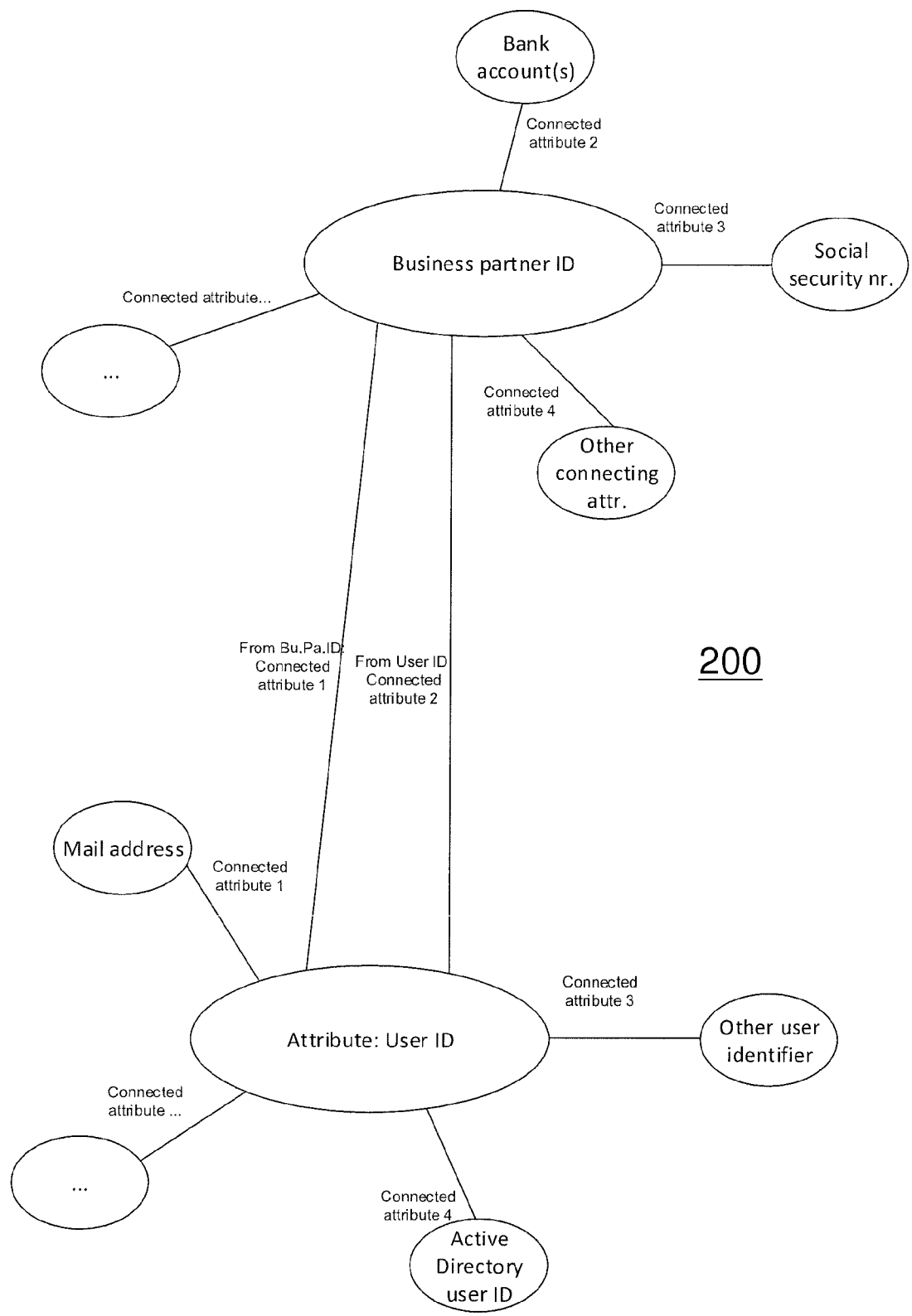
FIG. 2 illustrates a two-step chain star model by one standard metadata model.

In accordance with exemplary implementations, a standard metadata model is defined for the computing systems, which standard metadata model provides a chain of "connected" attributes from one metadata entity to another or group of other metadata entities. FIG. 2 illustrates a two-step chain star model 200 (i.e. connection between the metadata entities of two systems) by one standard metadata model. This standard metadata model enables a connected search by combining different metadata entities in a new "star model" and using a "chain search" feature. This also enables the transfer of results from a search of one computing system to a search on another computing system, and continue the "chain search" there too. Accordingly, a combined search in different computing systems is enabled, irrespective of their underlying technology.

Accordingly, consistent with implementations described herein, one or more standardized attributes of one computing system is associated with one or more standardized attributes of another computing system, to define connected metadata that connects attributes of the associated metadata entities. As an example, for a user ID, information such as mail address, business partner ID, etc., is available from the user master data, and starting with the user ID, the log data can be analyzed for events with the user's business partner ID, the user's mail address, etc. In some cases, not all attributes are "connected" attributes to all other attributes. In the above example, any further business relevant information (bank account, social security number, credit card number, . . . ) would be connected to the business partner ID, but not to the user ID.

Both the metadata and the connected metadata are stored in a central repository that is accessible by each of the computing systems. For each log, the assignment to the metadata is maintained. The metadata hence contains the information about which field in the log is representing which metadata attribute. For instance, the technical field BNAME of an Advanced Business Application Programming (ABAP) log can be maintained as containing the metadata attribute "user ID." In addition, the metadata is maintained with the information about where the business partner ID is contained (in the ABAP example: in the user master data). With this connected metadata, a search could be executed as follows: a User ID in a suspicious log entry→retrieve business partner ID by using connected metadata→continue search along all logs by searching first for user ID, then by business partner ID.

If one wants to extract the log data from e.g. the ABAP log to another system, by using the standard metadata model, the two values "user ID=<value user ID>, Business partner ID=<value B.p.ID>" could be retrieved and transmitted in the standard metadata model format. In addition, standardized information on the origin can be contained (system, timestamp, etc.). By importing the above information from one computing system into another computing system, a correlated search can be performed if the system user IDs and Business partner IDs are contained according to the standard metadata model.

Figure 3:
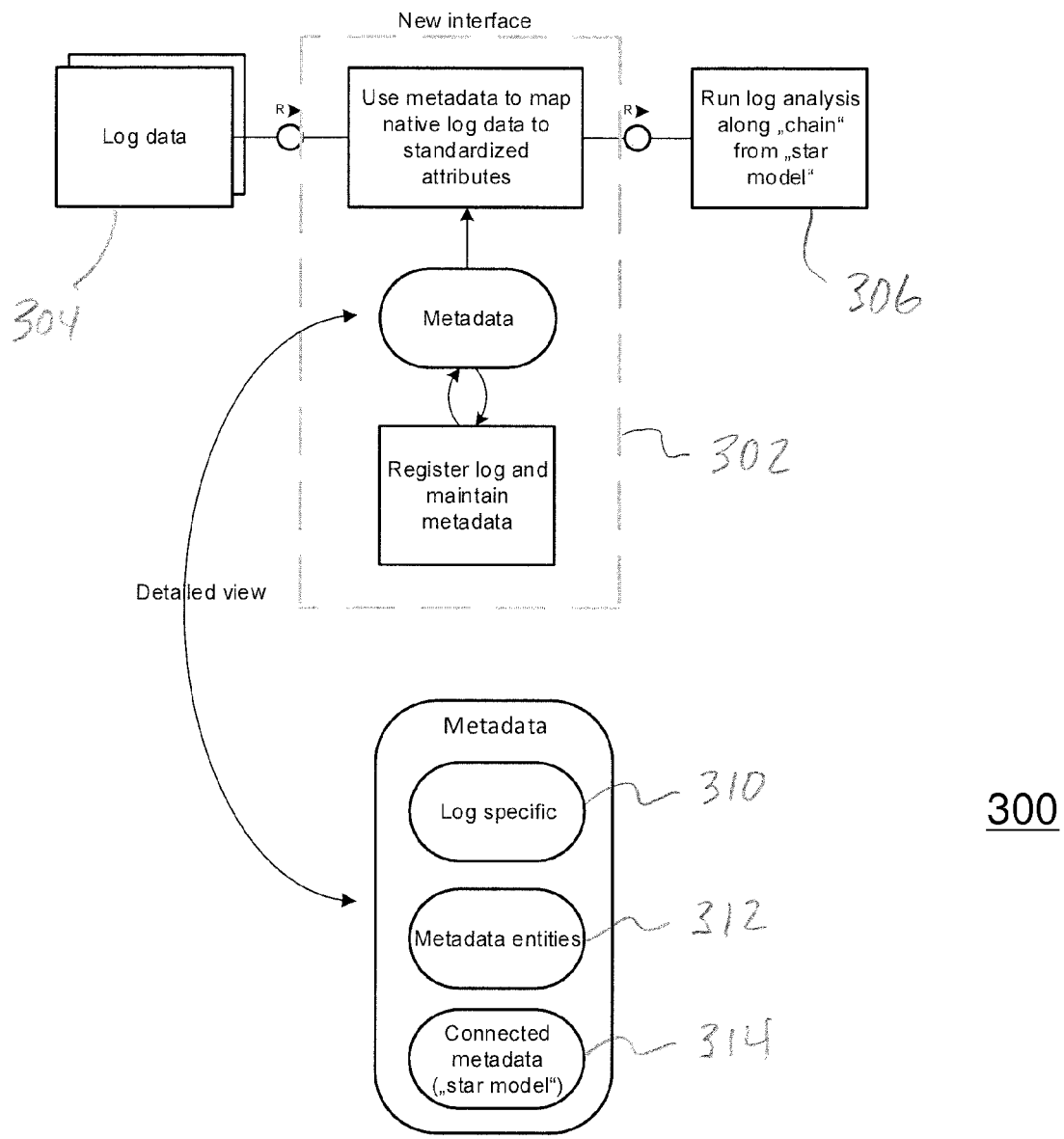
FIG. 3 illustrates a system having a standard metadata model interface for receiving and defining connected attributes from log data from a number of different, often disparate, computing systems.

FIG. 3 illustrates a system 300 having a standard metadata model interface 302 for receiving and defining connected attributes from log data from a number of different, often disparate, computing systems. The standard metadata model interface 302 allows log analysis, at 306, by evaluating the standard metamodel, which enables the definition and building of a star model of attributes and connected attributes. The standard metamodel interface 302 includes log-specific data 310 that is specific to each of the computing systems that maintain the log data 304, one or more metadata entities 312 mapped to the attributes of the log data, and the connected metadata 314.

The connected metadata 314 allows introduction of new standardized attributes. For instance, a system to register who entered the building by using an RFID card might include "RFID card" as an attribute, and connect that attribute to other attributes, to Business partner ID or Employee ID, for example. The connected metadata 314 also allows import and export of this metadata to make the information known in all participating computing systems. In the above example, this import/export functionality can make the new attribute "RFID card" with its connection to the user ID (and possibly to more attributes, following the "star model") known to other systems. Thus, if in one system the RFID card causes an access event, the user ID information is added in this system, as both can be correlated via the connected metadata 314. This information "RFID chip, user ID" can then be exported to another computing system. Even if there was no occurrence of the RFID chip value in the other computing system (as the RFID chip info is not contained here), a subsequent search on the user ID might be performed—with any further searches along the chain that follows the user ID.

Figure 4:
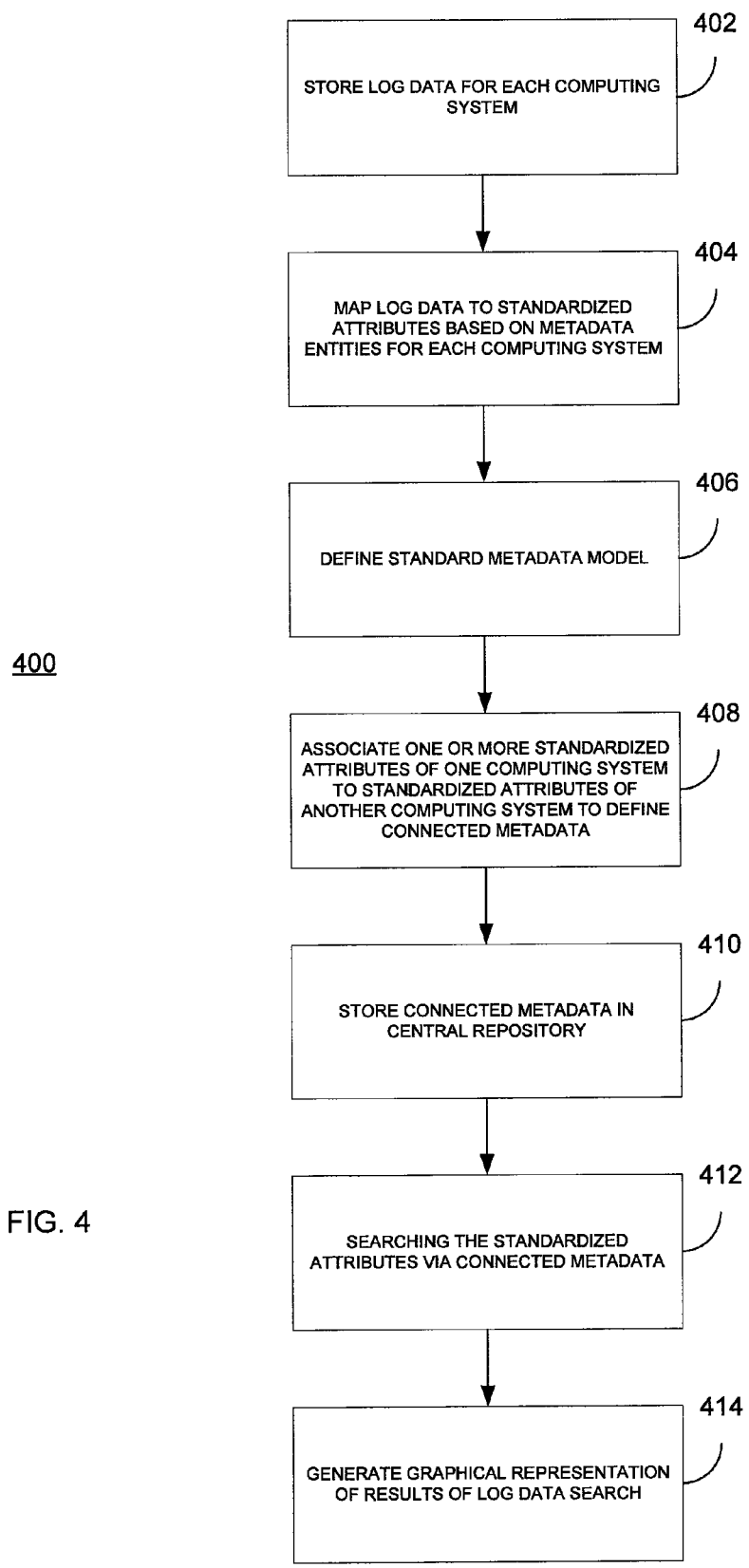
FIG. 4 is a flowchart of a method of employing a standard metadata model for analyzing events, i.e., for fraud, attack, or any other malicious background.

FIG. 4 is a flowchart of a method 400 of employing a standard metadata model for analyzing events, i.e., for fraud, attack, or any other malicious background. At 402, log data for each of one or more computing systems is stored. The storing can be done in a local memory by at least one data processor. At 404, the log data of each computing system is mapped to standardized attributes based on metadata entities defined for each of the computing systems. Relevant attributes can be original log source, user name, mail address, business partner ID, IP address, timestamp, amounts, and many others.

At 406, a standard metadata model is defined for the computing systems. The standard metadata model maintains not only common or related attributes, but also connections between metadata entities. At 408, one or more standardized attributes of a first computing system are associated with one or more standardized attributes of a second (or more) computing system, to define connected metadata that connects attributes of the associated metadata entities. At 410, the connected metadata is stored in a central repository that is accessible by each of the computing systems.

This enables a common search on logs from different origins, or from different computing systems. In other words, this allows searching on events of both origins within one system. At 412, for a selected access event to one computing system, where the selected access event generates log data related to that computing system, standardized attributes associated with the log data of at least one other computing system can be searched via the connected metadata stored in the central repository. At 414, graphical representation of results of log data search can be generated.

This enables searching and detection of fraud, attack or other malicious activity. For example, in a technical log, an irregularity for user X was detected. By evaluating the metadata connection, it is known that this user X belongs to business partner ID=123. With this information, business transaction logs can be evaluated for frauds of business partner ID=123. In other examples, the above techniques allow for searching for certain users/persons. The standard metadata model defines which attributes of which log a user name is contained. By evaluating the metadata, the translation from the "abstract" user name from the metadata is automatically translated into the specific user name from the specific log. An overview on all activities within the recorded logs for this user is hence possible. In yet another example, a search for coincidences is enabled. For example, one search can be defined as "for the event of type 'create user,' perform additional search on subsequent events that contain the same IP address". The connection would hence be "user name" ->IP address. The system will first search one log with the given event, and then extend to any other log(s) and search for the given IP address. This can be automated as well.

In still yet another feature, event data can be transferred among computing systems. Suspicious data can be collected in one computing system and transferred to another computing system, along with metadata information. On all events from the first system, additional searches can be extended into the other system, such as, for example, by user name. A query can be generated to see if there is any event in the second system for the same user (identified by either user name information, or IP address information, or by e-mail address information, etc.—information about where to find the user name is taken from the metadata).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

Other implementations may be within the scope of the following claims.

What is claimed is:

1. A method comprising:
    storing, by at least one data processor, log data for each of a plurality of computing systems;
    mapping, by at least one data processor, the log data of each computing system to standardized attributes based on metadata entities defined for each of the plurality of computing systems;
    defining, by at least one data processor, a standard metadata model for the plurality of computing systems;
    associating, by at least one data processor, one or more standardized attributes of a first computing system of the plurality of computing systems with one or more standardized attributes of a second computing system of the plurality of computing systems to define connected metadata that connects the one or more standardized attributes of the first computing system and the one or more standardized attributes of the second computing system;
    storing, by at least one data processor, the connected metadata in a central repository accessible by each of the plurality of computing systems;
    for a selected access event to the first computing system, the selected access event generating the log data related to the first computing system, searching, by at least one data processor, the standardized attributes associated with the log data of at least the second of the plurality of computing systems via the connected metadata stored in the central repository; and
    analyzing, by at least one data processor, a first graphical representation of one or more results of the searching.

2. The method in accordance with claim 1, wherein the standardized attributes include user identification data.

3. The method in accordance with claim 1, wherein the selected access event is a user-initiated access to the first computing system.

4. The method in accordance with claim 3, wherein the log data generated by the selected access event includes user identification data and timestamp data.

5. The method in accordance with claim 1, further comprising generating, by at least one data processor, a second graphical representation of the standardized attributes associated with the log data of at least the second of the plurality of computing systems.

6. A computer program product comprising a non-transitory machine-readable medium storing instructions that, when executed by at least one programmable processor, cause the at least one programmable processor to perform operations comprising:
    storing log data for each of a plurality of computing systems;
    mapping the log data of each computing system to standardized attributes based on metadata entities defined for each of the plurality of computing systems;
    defining a standard metadata model for the plurality of computing systems;
    associating one or more standardized attributes of a first computing system of the plurality of computing systems with one or more standardized attributes of a second computing system of the plurality of computing systems to define connected metadata that connects the one or more standardized attributes of the first computing system and the one or more standardized attributes of the second computing system;
    storing the connected metadata in a central repository accessible by each of the plurality of computing systems;
    for a selected access event to the first computing system, the selected access event generating the log data related to the first computing system, searching the standardized attributes associated with the log data of at least the second of the plurality of computing systems via the connected metadata stored in the central repository; and
    analyzing a first graphical representation of one or more results of the searching.

7. The computer program product in accordance with claim 6, wherein the standardized attributes include user identification data.

8. The computer program product in accordance with claim 6, wherein the selected access event is a user-initiated access to the first computing system.

9. The computer program product in accordance with claim 8, wherein the log data generated by the selected access event includes user identification data and timestamp data.

10. The computer program product in accordance with claim 6, wherein the operations further comprise generating a second graphical representation of the standardized attributes associated with the log data of at least the second of the plurality of computing systems.

11. A system comprising:
    at least one programmable processor; and
    a non-transitory machine-readable medium storing instructions that, when executed by the at least one processor, cause the at least one programmable processor to perform operations comprising:
        store log data for each of a plurality of computing systems;
        map the log data of each computing system to standardized attributes based on metadata entities defined for each of the plurality of computing systems;
        define a standard metadata model for the plurality of computing systems;
        associate one or more standardized attributes of a first computing system of the plurality of computing systems with one or more standardized attributes of a second computing system of the plurality of computing systems to define connected metadata that connects the one or more standardized attributes of the first computing system and the one or more standardized attributes of the second computing system;

store the connected metadata in a central repository accessible by each of the plurality of computing systems;

for a selected access event to the first computing system, the selected access event generating the log data related to the first computing system, search the standardized attributes associated with the log data of at least the second of the plurality of computing systems via the connected metadata stored in the central repository; and analyzing a first graphical representation of one or more results of the searching.

12. The system in accordance with claim 11, wherein the standardized attributes include user identification data.

13. The system in accordance with claim 11, wherein the selected access event is a user-initiated access to the first computing system.

14. The system in accordance with claim 13, wherein the log data generated by the selected access event includes user identification data and timestamp data.

15. The system in accordance with claim 11, wherein the operations further comprise generating a second graphical representation of the standardized attributes associated with the log data of at least the second of the plurality of computing systems.

* * * * *